United States Patent
Arakawa et al.

(10) Patent No.: US 10,052,773 B2
(45) Date of Patent: Aug. 21, 2018

(54) ROBOT

(71) Applicant: Seiko Epson Corporation, Tokyo (JP)

(72) Inventors: Yutaka Arakawa, Hara (JP); Osamu Miyazawa, Shimosuwa (JP)

(73) Assignee: Seiko Epson Corporation (JP)

( * ) Notice: Subject to any disclaimer, the term of this patent is extended or adjusted under 35 U.S.C. 154(b) by 459 days.

(21) Appl. No.: 14/919,041

(22) Filed: Oct. 21, 2015

(65) Prior Publication Data

US 2016/0114492 A1    Apr. 28, 2016

(30) Foreign Application Priority Data

Oct. 22, 2014  (JP) .................................. 2014-214949
Oct. 22, 2014  (JP) .................................. 2014-215138

(51) Int. Cl.
| | | |
|---|---|---|
| *H01L 41/09* | (2006.01) | |
| *B25J 18/00* | (2006.01) | |
| *B25J 9/12* | (2006.01) | |
| *B25J 17/02* | (2006.01) | |

(52) U.S. Cl.
CPC .............. *B25J 18/00* (2013.01); *B25J 9/126* (2013.01); *B25J 17/0258* (2013.01); *Y10S 901/23* (2013.01); *Y10S 901/29* (2013.01)

(58) Field of Classification Search
CPC ......... B25J 18/00; B25J 9/126; B25J 17/0258
USPC .... 310/311, 323.01, 323.02, 323.17, 323.18, 310/328
See application file for complete search history.

(56) References Cited

U.S. PATENT DOCUMENTS

| | | |
|---|---|---|
| 2012/0143174 A1 | 6/2012 | Choi et al. |
| 2013/0140952 A1 | 6/2013 | Kamijo et al. |
| 2014/0319967 A1* | 10/2014 | Asai ..................... H02N 2/0065 310/328 |
| 2016/0031482 A1* | 2/2016 | Lavoie ............... B62D 15/0285 701/41 |

FOREIGN PATENT DOCUMENTS

| | | |
|---|---|---|
| EP | 2645560 A1 | 10/2013 |
| JP | H01-210288 A | 8/1989 |
| JP | 08-243972 A | 9/1996 |
| JP | H11-254377 A | 9/1999 |
| JP | 2004-280355 A | 10/2004 |
| JP | 2005-014102 A | 1/2005 |
| JP | 2013-121191 A | 6/2013 |
| JP | 2013-230018 A | 11/2013 |
| JP | 2014-082874 A | 5/2014 |
| JP | 2014-084989 A | 5/2014 |
| WO | WO-2010-007837 A1 | 1/2010 |

OTHER PUBLICATIONS

Extended European Search Report for Application No. EP 15190572.6 dated Mar. 14, 2016 (7 pages).

* cited by examiner

*Primary Examiner* — Thomas Dougherty
(74) *Attorney, Agent, or Firm* — Harness, Dickey & Pierce, P.L.C.

(57) ABSTRACT

A robot includes a first arm unit and a second arm unit. The robot includes a first drive part provided within the first arm unit and rotating the first arm unit about a first axis, and a second drive part provided within the first arm unit and rotating the second arm unit about a second axis. At least one of the first drive part and the second drive part contains a piezoelectric body.

10 Claims, 12 Drawing Sheets

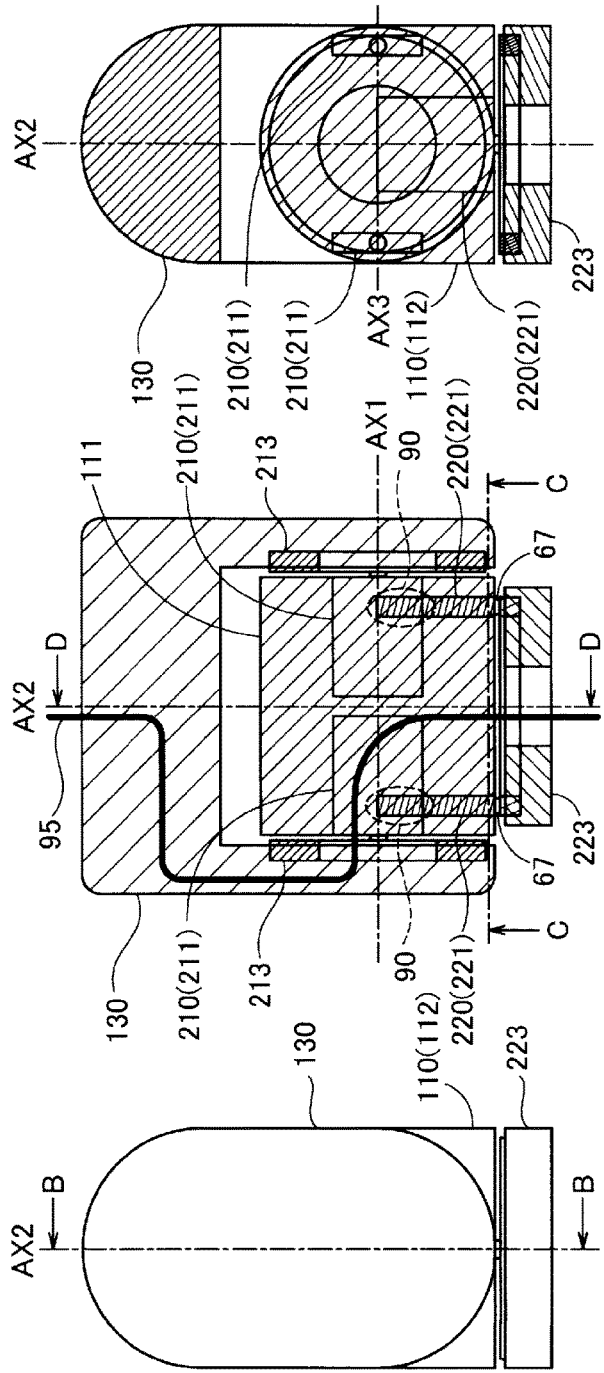

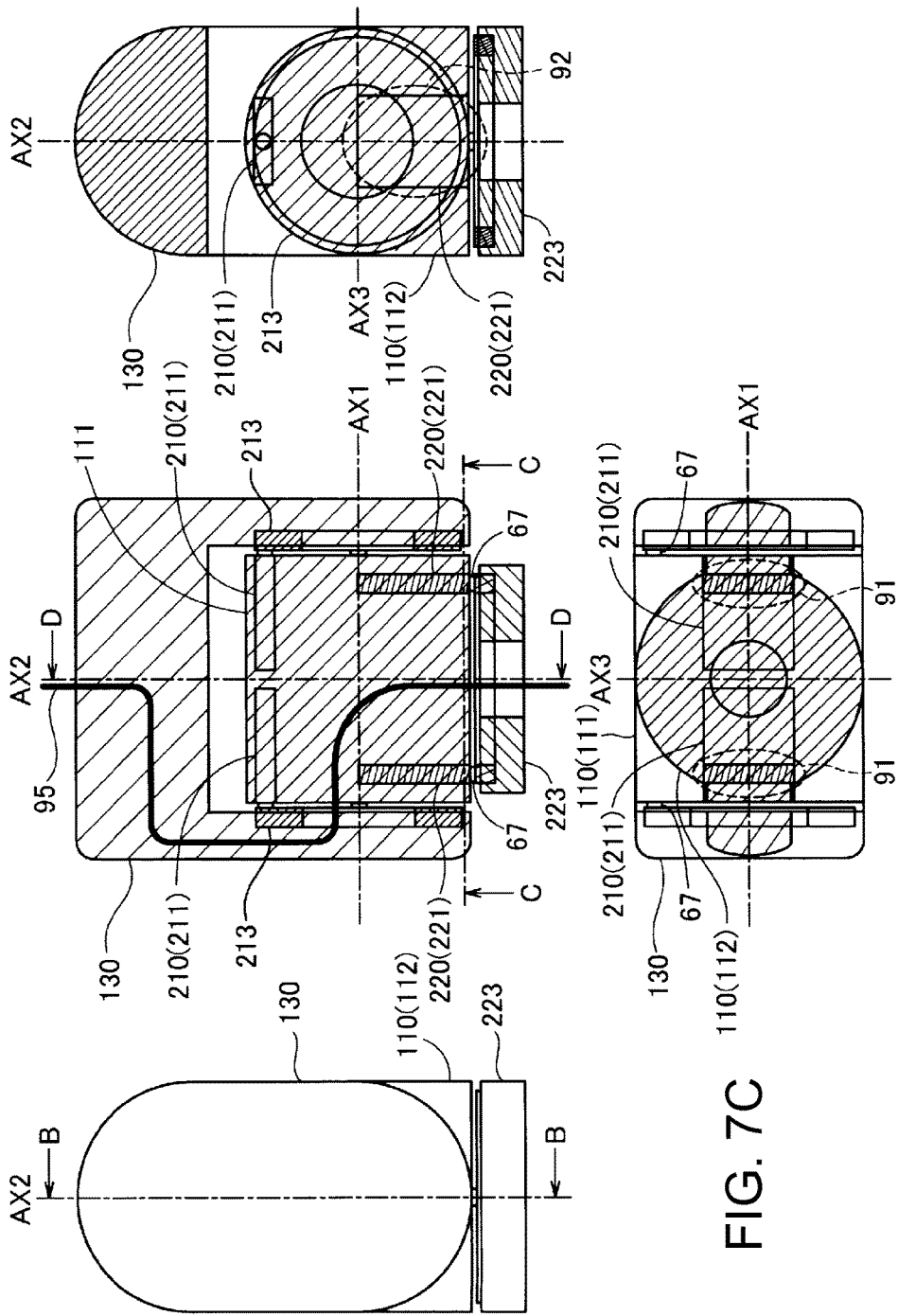

ROBOT

BACKGROUND

1. Technical Field

The present invention relates to a robot.

2. Related Art

In related art, there is a robot that drives an arm using an electromagnetic motor (for example, see JP-A-2014-84989).

Robots having articulated robot arms like the robot apparatus in JP-A-2014-84989 are proposed. In the robot apparatus, driving of the respective joints is executed by a driving device having an electromagnetic motor (also referred to as "electric motor") and a reducer.

However, the mounting space of the electromagnetic motor tends to be larger, and, in the case where a driving device by the electromagnetic motor is used as a driving device of joints of a robot arm, there are the following problems. Namely, if priority is given to the mounting space for the driving device within the robot arm, the size of the robot arm including thickness is larger, and, in contrast, if priority is given to the size of the robot arm including thickness, the space for the driving device and wiring etc. therefor is harder to be secured. Particularly, in the case of a structure in which the thickness of the arm is made smaller toward the distal end side of the robot arm, the problem becomes especially prominent. Further, when the driving device by the electromagnetic motor is used, the deadweight of the robot arm is larger. The driving device closer to the base side of the robot arm requires a driving device using a larger-sized higher-power electromagnetic motor, and it is desired to reduce the weight of the robot arm, particularly, the weight of the distal end (wrist) side.

SUMMARY

An advantage of some aspects of the invention is to solve at least a part of the problems described above, and the can be implemented as the following aspects.

(1) An aspect of the invention provides a robot including a first arm unit and a second arm unit. The robot includes a first drive part provided within the first arm unit and rotating the first arm unit about a first axis; and a second drive part provided within the first arm unit and rotating the second arm unit about a second axis, and at least one of the first drive part and the second drive part contains a piezoelectric body. According to the robot having the configuration, at least one of the first drive part and the second drive part is a drive part containing the piezoelectric body, and thereby, the part may be downsized. Therefore, shortage of the wiring space within the arm of the robot may be suppressed.

(2) In the robot according to the aspect, when the first drive part and the second drive part are seen along a third axis orthogonal to the first axis and the second axis, there may be apart in which the first drive part and the second drive part overlap. According to the robot having this configuration, the first drive part and the second drive part can be efficiently arranged within the first arm unit, and thus, the shortage of the wiring space within the arm can be suppressed.

(3) In the robot according to the aspect, when the first drive part and the second drive part are seen along the second axis, there may be a part in which the first drive part and the second drive part overlap, and, when the second drive part is seen along the first axis, there may be a part in which a driven part driven by the first drive part and the second drive part overlap. According to the robot having this configuration, the first drive part and the second drive part can be efficiently arranged within the first arm unit, and thus, the shortage of the wiring space within the arm can be suppressed.

(4) In the robot according to the aspect, the driven part may have an opening. According to the robot having this configuration, wires can pass through the opening within the driven part.

(5) In the robot according to the aspect, the first axis and the second axis may be orthogonal to each other. According to the robot having this configuration, the first arm unit can be formed as an arm unit rotatable about two axes orthogonal to each other.

(6) In the robot according to the aspect, the first drive part and the second drive part may respectively contain piezoelectric bodies. According to the robot having this configuration, the first drive part and the second drive part can be efficiently arranged within the first arm unit, and thus, the shortage of the wiring space within the arm can be suppressed.

(7) In the robot according to the aspect, the first drive part can be formed by one or more first piezoelectric driving devices containing the piezoelectric bodies. According to the robot having this configuration, drive power of the first drive part can be increased according to the number of the first piezoelectric driving devices.

(8) In the robot according to the aspect, the second drive part can be formed by one or more second piezoelectric driving devices containing the piezoelectric bodies. According to the robot having this configuration, drive power of the second drive part can be increased according to the number of the second piezoelectric driving devices.

(9) In the robot according to the aspect, a number of the second piezoelectric driving devices forming the second drive part may be smaller than a number of the first piezoelectric driving devices forming the first drive part. According to the robot having this configuration, the mechanism of the part for rotating the second arm unit can be downsized.

(10) The robot according to the aspect may include an end effector provided in the second arm unit. According to the robot having this configuration, the first arm unit is downsized, and thereby, operability using the end effector can be improved.

(11) Another aspect of the invention provides a robot including an arm having a plurality of joints. In the robot, a driving device of at least one joint of the plurality of joints is a piezoelectric driving device and a driving device of at least one joint of the plurality of joints is an electric motor. According to the robot having this configuration, the driving device formed by the piezoelectric driving device can be reduced in size, thickness, and weight compared to the driving device formed by the electric motor, the internal space can be increased, and shortage of the internal space such as the wiring space can be suppressed.

(12) In the robot according to the aspect, an end effector may be attached, and the driving device of the joint for rotating a distal end portion of the arm may be the piezoelectric driving device. According to the robot having this configuration, the internal space of the arm can be increased in the distal end portion of the arm, and shortage of the space for providing cables etc. can be suppressed. Further, the weight of the distal end portion of the arm can be reduced.

(13) In the robot according to the aspect, the end effector may be driven by the piezoelectric driving device. According to the robot having this configuration, the weight of the distal end of the arm can be further reduced.

(14) In the robot according to the aspect, the piezoelectric driving device may include a vibrating plate having a first surface and a second surface and a vibrating structure provided on at least one surface of the first surface and the second surface of the vibrating plate, and the vibrating structure may include a piezoelectric body and a first electrode and a second electrode sandwiching the piezoelectric body. According to the robot having this configuration, the driving device can be reduced in size, thickness, and weight.

The invention can be implemented in various other aspects than the aspect of the robot. For example, the invention can be implemented in aspects of a robot arm, a driving device for driving a robot, etc.

BRIEF DESCRIPTION OF THE DRAWINGS

The invention will be described with reference to the accompanying drawings, wherein like numbers reference like elements.

FIG. 5A shows application of a voltage at a specific frequency to two piezoelectric elements diagonally-located to each other as a pair, and FIG. 5B shows application of a voltage at a specific frequency to the other pair of piezoelectric elements.

FIGS. 6A to 6D show an arrangement of a first drive part and the second drive part, and FIG. 6A is a side view of a part of a third arm unit, FIG. 6B is a sectional view along B-B in FIG. 6A, FIG. 6C is a sectional view along C-C in FIG. 6B, and FIG. 6D is a sectional view along D-D in FIG. 6B.

FIGS. 7A to 7D show an arrangement of a first drive part and a second drive part in the second embodiment, FIG. 7A is a side view of a part of a third arm unit, FIG. 7B is a sectional view along B-B in FIG. 7A, FIG. 7C is a sectional view along C-C in FIG. 7B, and FIG. 7D is a sectional view along D-D in FIG. 7B.

FIG. 13A shows application of a voltage at a specific frequency to two piezoelectric elements diagonally-located to each other as a pair, and FIG. 13B shows application of a voltage at a specific frequency to the other pair of piezoelectric elements.

DESCRIPTION OF EXEMPLARY EMBODIMENTS

A. First Embodiment

Figure 1:
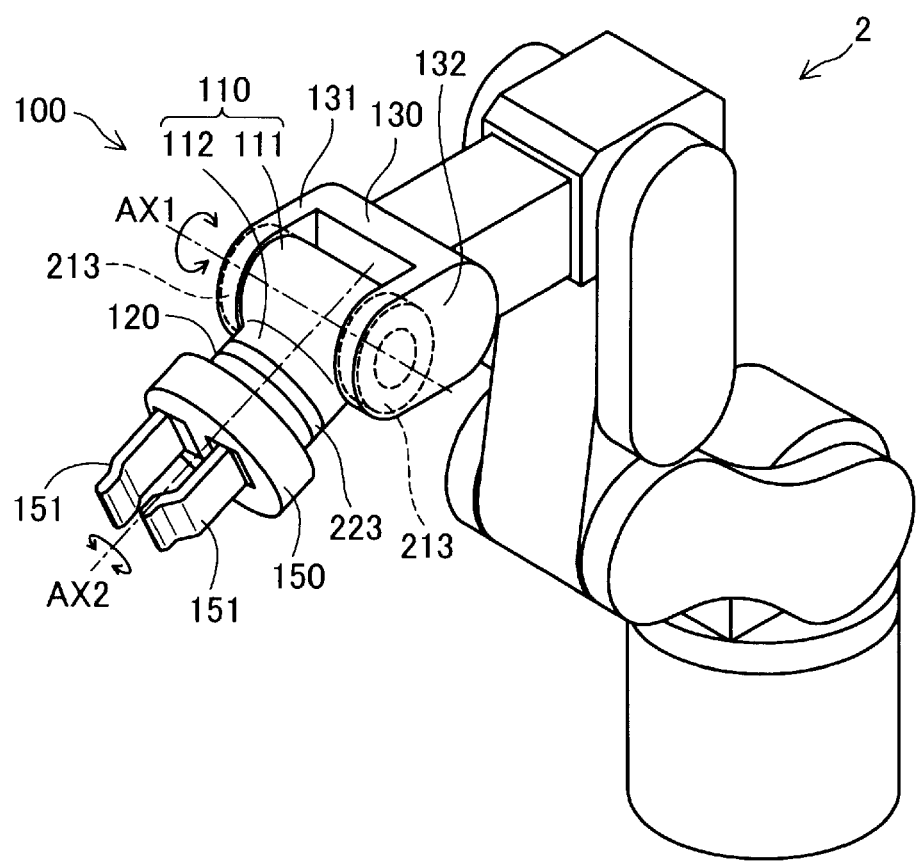
FIG. 1 is a perspective view of a robot as the first embodiment.

FIG. 1 is a perspective view of a robot as the embodiment. A robot 2 of the embodiment is formed as a vertical articulated robot. The robot 2 includes an arm 100 including a first arm unit 110 and a second arm unit 120. The first arm unit 110 includes a first axis AX1 and a second axis AX2. The first axis AX1 extends in the horizontal direction. Further, the first axis AX1 is an axis about which the first arm unit 110 rotates in the vertical direction with respect to a third arm unit 130. The second axis AX2 is an axis about which the second arm unit 120 rotates with respect to the first arm unit 110. In the embodiment, the first axis AX1 and the second axis AX2 are orthogonal to each other.

The first arm unit 110 includes a main body part 111 and a projecting part 112. The main body part 111 is a cylindrical member extending along the first axis AX1. The projecting part 112 is provided in a part of the side surface of the main body part 111 as a cylindrical member along the second axis AX2. As below, as seen from the first arm unit 110, the projecting part 112 side is referred to as "distal end side" and the main body part 111 is referred to as "proximal end side".

The main body part 111 is supported by a first supporting part 131 and a second supporting part 132 provided in the third arm unit 130 to be sandwiched from two opposite directions on the first axis AX1. In the first supporting part 131 and the second supporting part 132 of the third arm unit 130, annularly-shaped first rotors 213 are respectively fixed between the main body part 111 of the first arm unit 110 and themselves.

The second arm unit 120 is provided on the distal end side of the projecting part 112 of the first arm unit 110. The second arm unit 120 is a cylindrical member extending along the first axis AX1. In the second arm unit 120, an annularly-shaped second rotor 223 is fixed between the first arm unit 110 and itself.

An end effector 150 is provided on the end of the second arm unit 120. The end effector 150 rotates about the second axis AX2 with the second arm unit 120. The end effector 150 includes a grasping part 151 for grasping work. Within the end effector 150, an actuator for driving the grasping part 151 is provided. The actuator is controlled by a control device (not shown) connected to the robot 2. The actuator and the control device are connected by wires (not shown) inserted through the respective arm units. As the actuator for driving the grasping part 151, a piezoelectric driving device, an electromagnetic motor, or the like, which will be described later may be used.

Figure 2:
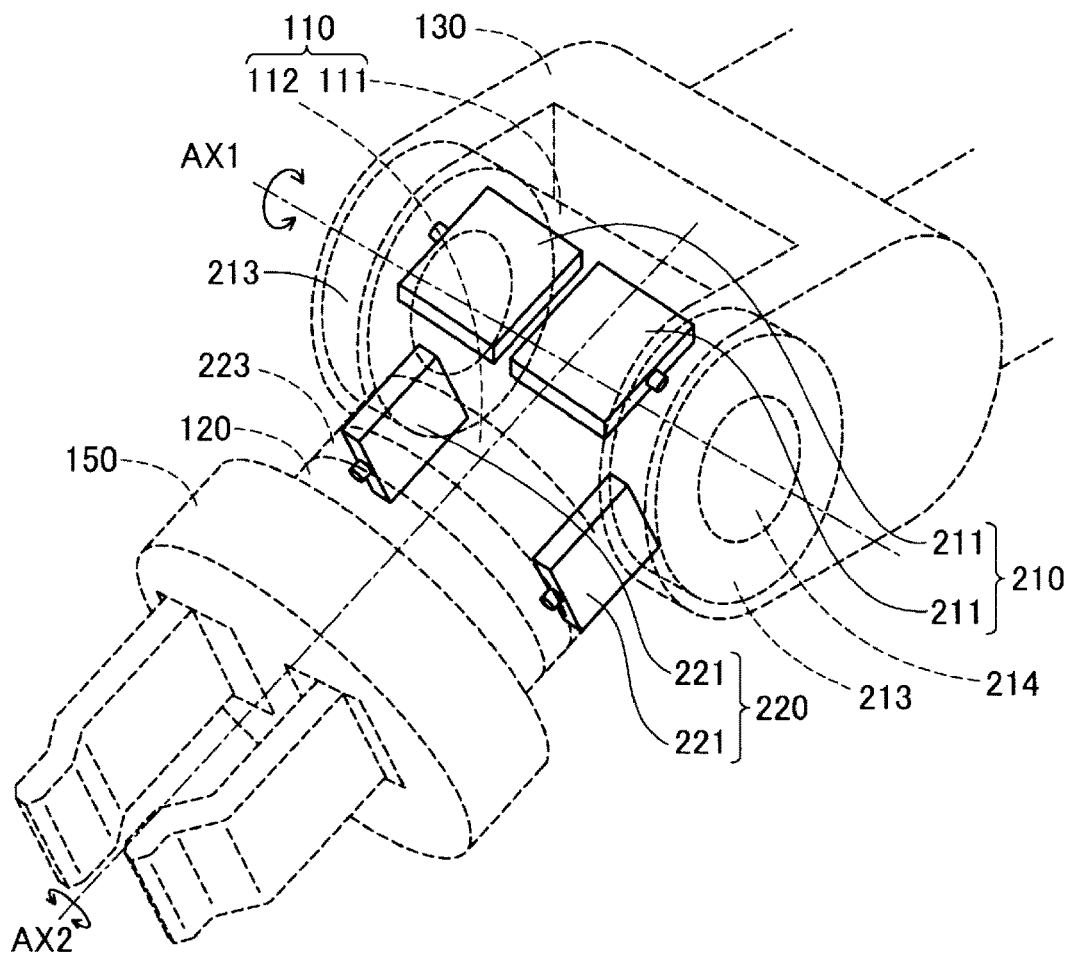
FIG. 2 shows an internal configuration of a first arm unit.

FIG. 2 shows an internal configuration of the first arm unit 110. The first arm unit 110 includes a first drive part 210 and a second drive part 220 inside. In the embodiment, the first drive part 210 includes a plurality of first piezoelectric driving devices 211. The second drive part 220 includes a plurality of second piezoelectric driving devices 221. Note that, in FIG. 2, for convenience of illustration, only part of the first piezoelectric driving devices 211 is shown. The first drive part 210 is provided within the main body part 111. Apart of the second drive part 220 is provided within the projecting part 112 and the other part is provided within the main body part 111.

The first drive part 210 drives the first rotors 213 fixed to the inner side surfaces of the third arm unit 130, and thereby, relatively rotates the first arm unit 110 about the first axis AX1. Openings 214 are formed at the centers of the first rotors 213. Wires (not shown) connected to the end effector 150, the first drive part 210, and the second drive part 220 pass through the openings.

Figure 3:
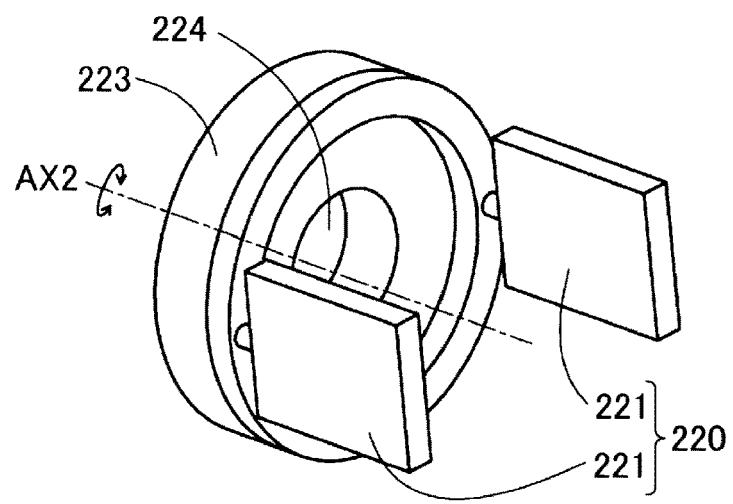
FIG. 3 is a perspective view showing a second drive part and a second rotor in FIG. 2.

FIG. 3 is a perspective view showing the second drive part 220 and the second rotor 223 in FIG. 2. The second drive part 220 drives the second rotor 223 fixed to the proximal end of the second arm unit 120, and thereby, rotates the second arm unit 120 about the second axis AX2. An opening 224 is formed at the center of the second rotor 223. The wires (not shown) connected to the end effector 150 pass through the opening 224.

Figure 4:
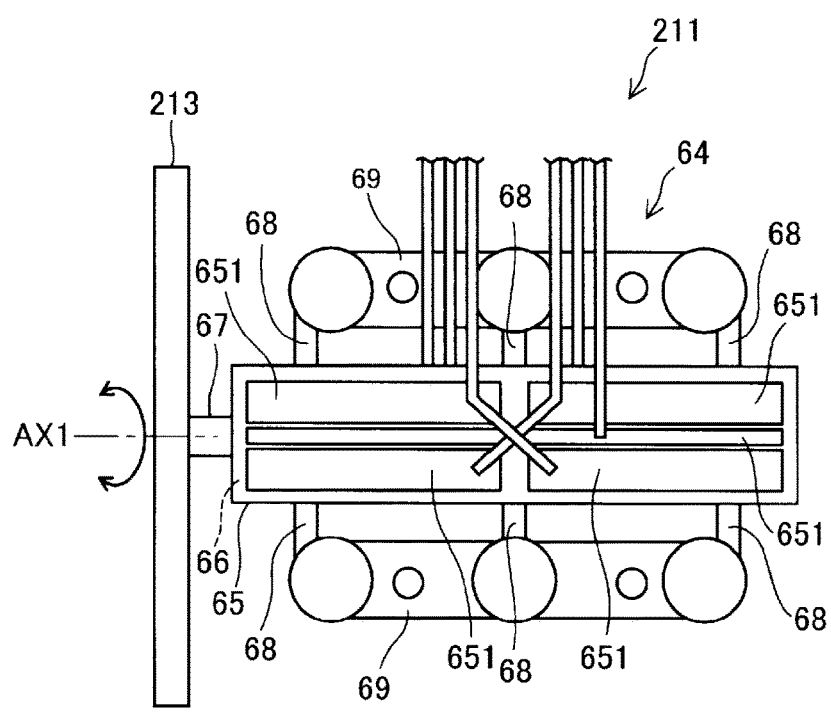
FIG. 4 is an explanatory diagram showing an internal configuration of a piezoelectric driving device.

FIG. 4 is an explanatory diagram showing an internal configuration of the piezoelectric driving device forming the first drive part 210 and the second drive part 220. The first piezoelectric driving device 211 and the second piezoelectric driving device 221 have the same configuration, and the configuration of the first piezoelectric driving device 211 will be representatively explained. The first piezoelectric driving device 211 is driven by a drive circuit (not shown), and rotates the first rotor 213 as a driven part. The drive circuit for the first piezoelectric driving device 211 is mounted on e.g. the control device connected to the robot 2.

The first piezoelectric driving device 211 includes two sets of vibrating structures 65 including five piezoelectric elements 651, and a vibrating plate 66 inserted and bonded between the sets. The length of the long side of each piezoelectric element 651 is e.g. 3.5 mm to 30 mm.

Each of the five piezoelectric elements 651 of the vibrating structure 65 includes a piezoelectric body, and a first electrode and a second electrode sandwiching the piezoelectric body (not shown). One of the first electrode and the second electrode may be a common electrode. These piezoelectric elements 651 are electrically connected to the drive circuit (not shown). Note that it is only necessary that the vibrating structure 65 includes at least one piezoelectric element 651, and other various numbers and arrangements of the elements may be employed. Further, it is only necessary that the vibrating structure 65 is provided at least on one of the two surfaces of the vibrating plate 66.

On an end of the first piezoelectric driving device 211, a protruding portion 67 is provided. On both side surfaces of the first piezoelectric driving device 211, a plurality of supporting portions 68 for supporting the first piezoelectric driving device 211 are provided in positions corresponding to the nodes of the vibration. These supporting portions 68 are integrally formed with the vibrating plate 66. It is preferable that the plurality of supporting portions 68 protruding from the same side of the vibrating plate 66 are coupled via a connecting plate 69.

Figures 5A, 5B:
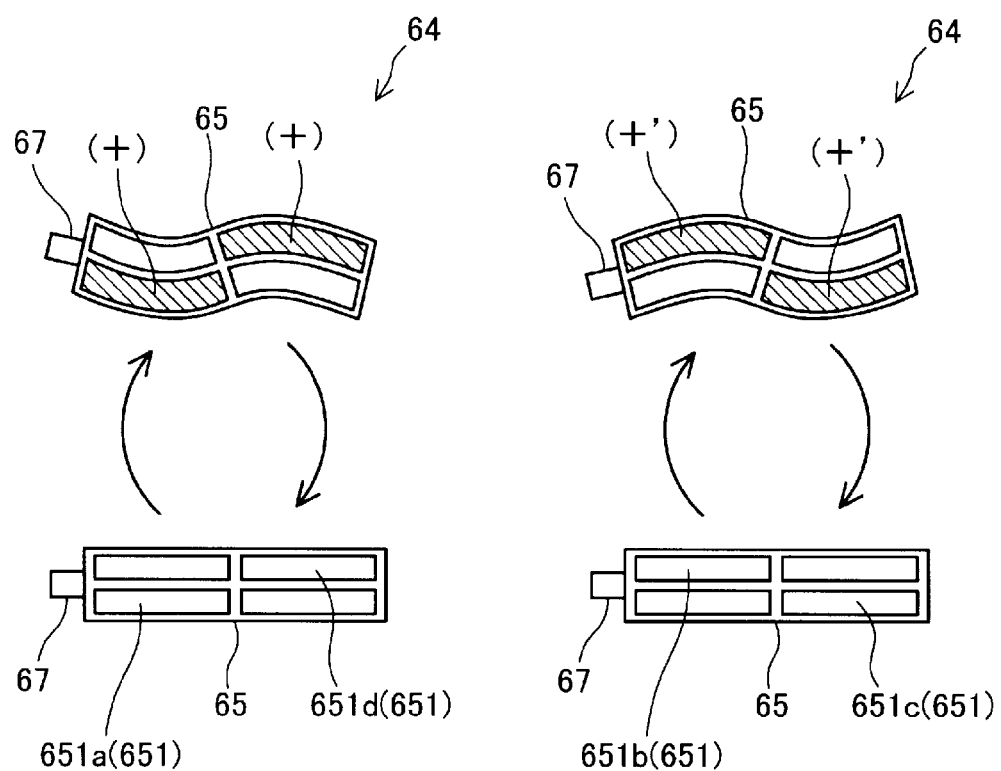
FIGS. 5A and 5B are explanatory diagrams showing an operating principle of the piezoelectric driving device.

FIGS. 5A and 5B are explanatory diagrams showing an operating principle of the piezoelectric driving device. To facilitate explanation, in FIGS. 5A and 5B, of the five piezoelectric elements 651 in FIG. 4, only four diagonally provided piezoelectric elements 651 are shown, and one piezoelectric element 651 at the center is omitted. When a voltage is applied to the piezoelectric elements 651 at a constant frequency, the first piezoelectric driving device 211 moves by expansion and contraction or elliptic motion of the projecting portion 67 of the first piezoelectric driving device 211. Namely, as shown in FIG. 5A, with the two piezoelectric elements 651 diagonally located to each other as one pair, when a voltage at a specific frequency is applied thereto, the first piezoelectric driving device 211 is bent and deformed into a meandering shape (S-shape) and the end of the projecting portion 67 makes a reciprocating motion or elliptic motion in a specific direction. As a result, the first rotor 213 in contact with the projecting portion 67 rotates in a predetermined direction around the first axis AX1. Further, as shown in FIG. 5B, when a voltage at a specific frequency is applied to the other pair of piezoelectric elements 651, the first rotor 213 rotates in the opposite direction. The movement of the first piezoelectric driving device 211 (or the vibrating structure 65) is described in the related art document (JP-A-2004-320979 or the counterpart U.S. Pat. No. 7,224,102), and the disclosure is incorporated herein by reference.

FIGS. 6A to 6D show an arrangement of the first drive part 210 and the second drive part 220 within the first arm unit 110. FIG. 6A is a side view of a part of the third arm unit 130. FIG. 6B is a sectional view along B-B in FIG. 6A. FIG. 6C is a sectional view along C-C in FIG. 6B. FIG. 6D is a sectional view along D-D in FIG. 6B. In FIGS. 6A to 6D, the first axis AX1 and the second axis AX2 are shown, and a virtual third axis AX3 orthogonal to these axes is shown. As below, for convenience, the upward direction of the third axis AX3 in FIG. 6C is "upside" and the downward direction of the third axis AX3 in FIG. 6C is "downside". FIG. 6B shows a wire 95 connected to the end effector 150 passing through the respective arm units.

The lengths of the long sides of the first piezoelectric driving device 211 and the second piezoelectric driving device 221 (the lengths along the axes of the projecting portions 67) in the embodiment are shorter than the diameter of the main body part 111 of the first arm unit 110 and about a half of the diameter of the main body part 111. Further, the lengths of the short sides of the first piezoelectric driving device 211 and the second piezoelectric driving device 221 are about one third of the diameter of the main body part 111 of the first arm unit 110.

In the embodiment, the first drive part 210 includes the four first piezoelectric driving devices 211. The second drive part 220 includes the two second piezoelectric driving devices 221. Namely, in the embodiment, the number of second piezoelectric driving devices 221 forming the second drive part 220 is smaller than the number of first piezoelectric driving devices 211 forming the first drive part 210. As shown in FIG. 6C, the four first piezoelectric driving devices 211 forming the first drive part 210 are provided on the upside and the downside within the main body part 111 respectively by twos. The two first piezoelectric driving devices 211 on the upside are provided with the respective projecting portions 67 facing in the opposite directions along the first axis AX1 so as to respectively drive the two first rotors 213 provided in the third arm unit 130. Also, the two first piezoelectric driving devices 211 on the downside are provided with the respective projecting portions 67 facing in the opposite directions along the first axis AX1 so as to respectively drive the two first rotors 213 provided in the third arm unit 130. As shown in FIG. 6B, the two second piezoelectric driving devices 221 forming the second drive part 220 are provided one by one near both ends of the first axis AX1 within the first arm unit 110 so that the respective projecting portions 67 face toward the second rotor 223 side along the second axis AX2.

In the embodiment, as shown in FIG. 6B, when the first drive part 210 and the second drive part 220 are seen along the third axis AX3, namely, the first drive part 210 and the second drive part 220 are seen from the upside or downside of the first arm unit 110, parts 90 overlapping with the first drive part 210 and the second drive part 220 exist. In other words, when the first drive part 210 and the second drive part 220 are projected on a plane containing the first axis AX1 and the second axis AX2, overlapping parts exist in the projected area formed by the first drive part 210 and the projected area formed by the second drive part 220.

According to the above described robot 2 of the embodiment, the first drive part 210 and the second drive part 220 are formed by the small piezoelectric driving devices containing piezoelectric bodies, and the first drive part 210 that rotates with respect to the first axis AX1 and the second drive part 220 that rotates with respect to the second axis AX2 may be efficiently arranged within the first arm unit 110. Accordingly, the shortage of the space for wiring within the first arm unit 110 may be suppressed.

Further, in the embodiment, the first drive part 210 and the second drive part 220 are arranged within the first arm unit 110 so that the parts 90 overlapping with the first drive part 210 and the second drive part 220 may exist when the first drive part 210 and the second drive part 220 are seen along the third axis AX3 orthogonal to the first axis AX1 and the second axis AX2. Accordingly, the first drive part 210 and the second drive part 220 may be efficiently arranged within the first arm unit 110 without any interference between the first drive part 210 and the second drive part 220. Therefore, the shortage of the space for wiring within the first arm unit 110 may be suppressed more effectively.

Furthermore, in the embodiment, the first rotors 213 and the second rotor 223 respectively have the openings formed therein, and thereby, efficient wiring may be provided through the openings. In addition, in the embodiment, the first axis AX1 and the second axis AX2 are orthogonal to each other, and thereby, the first arm unit 110 may be formed as an arm unit rotatable about the two orthogonal axes.

Further, in the embodiment, both the first drive part 210 and the second drive part 220 are formed by the piezoelectric driving devices containing the piezoelectric bodies, and thereby, the first drive part 210 and the second drive part 220 may be more efficiently arranged within the first arm unit 110. Accordingly, the shortage of the wiring space within the first arm unit 110 may be suppressed more effectively.

Furthermore, in the embodiment, the first drive part 210 is formed by the plurality of first piezoelectric driving devices 211, and thereby, the drive power of the first drive part 210 may be increased according to the number of first piezoelectric driving devices 211. In the embodiment, the second drive part 220 is formed by the plurality of second piezoelectric driving devices 221, and thereby, the drive power of the second drive part 220 may be increased according to the number of second piezoelectric driving devices 221.

In addition, in the embodiment, the number of second piezoelectric driving devices 221 forming the second drive part 220 is smaller than the number of first piezoelectric driving devices 211 forming the first drive part 210. Accordingly, the mechanism of the part for rotating the second arm unit 120, i.e., the mechanism near the projecting part 112 may be downsized. Thereby, operability of the end effector provided in the second arm unit 120 may be improved.

For example, when the first drive part 210 and the second drive part 220 are formed using electromagnetic motors, a reducer and a brake for holding the halt state are necessary and the weight becomes heavier. Accordingly, the arm 100 is likely to sag due to its own weight. However, in the embodiment, the drive parts are formed using the piezoelectric driving devices. Generally, the piezoelectric driving device includes a lighter weight than the electromagnetic motor, and does not require any reducer or brake. Accordingly, the weights of the drive parts may be significantly reduced. As a result, sagging of the arm 100 due to its own weight may be suppressed.

B. Second Embodiment

FIGS. 7A to 7D show an arrangement of the first drive part 210 and the second drive part 220 in the embodiment. The embodiment is different from the first embodiment in the arrangement of the first drive part 210 and the number of first piezoelectric driving devices 211 forming the first drive part 210. Specifically, in the embodiment, the first drive part 210 is formed by the two first piezoelectric driving devices 211 and those first piezoelectric driving devices 211 are provided on the proximal end of the main body part 111 of the first arm unit 110. Further, the respective first piezoelectric driving devices 211 are provided with the respective projecting portions 67 facing in the opposite directions along the first axis AX1 so as to drive the two first rotors 213 provided in the third arm unit 130.

In the embodiment, as shown in FIG. 7C, when the first drive part 210 and the second drive part 220 are seen along the second axis AX2, parts 91 overlapping with the first drive part 210 and the second drive part 220 exist. In other words, when the first drive part 210 and the second drive part 220 are projected on a plane containing the first axis AX1 and the third axis AX3, overlapping parts exist between the projected area formed by the first drive part 210 and the projected area formed by the second drive part 220. Further, in the embodiment, as shown in FIG. 7D, when the second drive part 220 is seen along the first axis AX1, a part 92 in which the first rotor 213 and the second drive part 220 overlap exists. In other words, when the first rotor 213 and the second drive part 220 are projected on a plane containing the second axis AX2 and the third axis AX3, an overlapping part exists between the projected area formed by the first rotor 213 and the projected area formed by the second drive part 220.

According to the above described second embodiment, the first drive part 210 and the second drive part 220 may be efficiently arranged within the first arm unit 110 without any interference between the first drive part 210 and the second drive part 220. Therefore, the shortage of the space for wiring within the first arm unit 110 may be suppressed. In addition, the same advantages as those of the first embodiment may be obtained.

C. MODIFIED EXAMPLES

Modified Example 1

Figure 8:
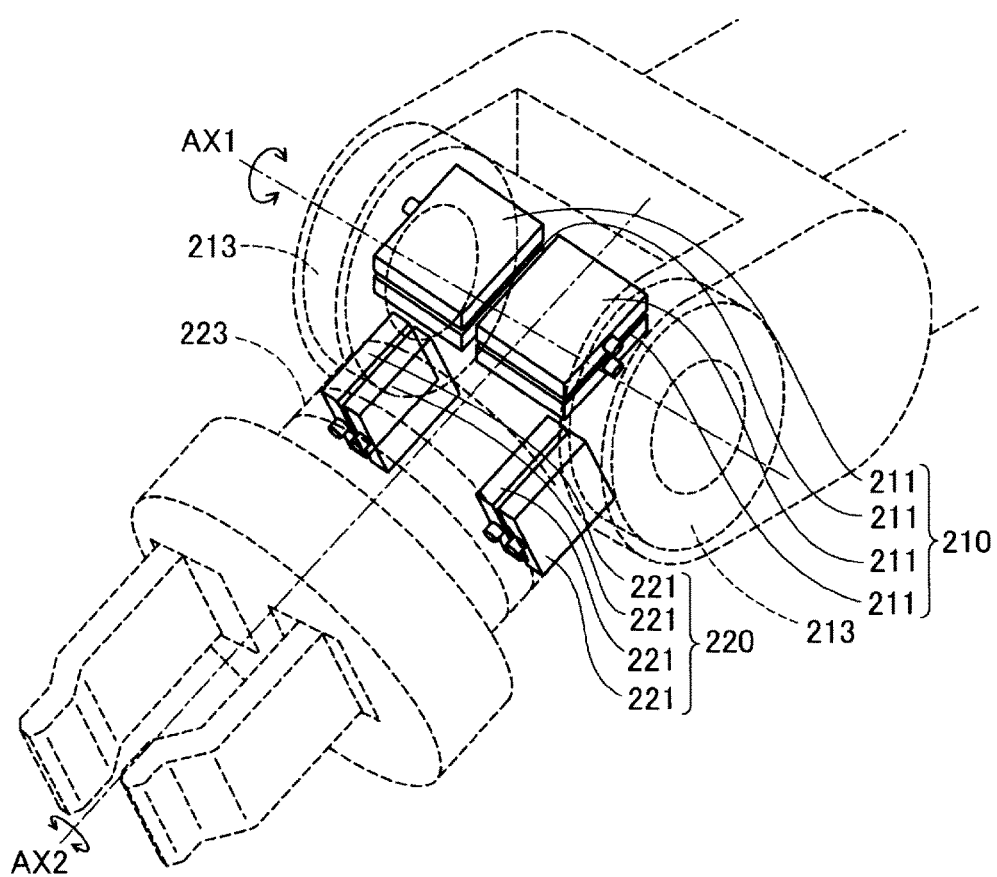
FIG. 8 shows a modified example of the first drive part and the second drive part.

FIG. 8 shows a modified example of the first drive part 210 and the second drive part 220. As shown in FIG. 8, the first drive part 210 may be formed by an arrangement of a plurality of first piezoelectric driving devices 211 adjacent to each other. Further, the second drive part 220 may be formed by an arrangement of a plurality of second piezoelectric driving devices 221 adjacent to each other. The first drive part 210 and the second drive part 220 are formed as described above, the drive power for driving the first rotors 213 and the second rotor 223 may be increased.

Modified Example 2

In the first embodiment, the number of second piezoelectric driving devices 221 forming the second drive part 220 is smaller than the number of first piezoelectric driving devices 211 forming the first drive part 210, and, in the second embodiment, the number of second piezoelectric driving devices 221 and the number of first piezoelectric driving devices 211 are the same. On the other hand, the number of second piezoelectric driving devices 221 may be larger than the number of first piezoelectric driving devices 211. Further, the numbers of the respective piezoelectric driving devices described in the respective embodiments are just examples. The numbers of the respective piezoelectric driving devices can be set according to the size of the robot 2, the size of the piezoelectric driving devices, and torque required for rotation of the respective shafts.

Modified Example 3

In the above described embodiments, the first arm unit 110 includes two axes, however, may have three or more axes. Further, in the above described embodiments, the first axis AX1 and the second axis AX2 are orthogonal to each other, however, these axes may be in parallel or intersect. Or, the axes may be in the skew positions.

Modified Example 4

In the above described embodiments, the main body part 111 and the projecting part 112 of the first arm unit 110 and the second arm unit 120 respectively have the cylindrical shapes, and they may have other shapes, e.g. columnar shapes.

Modified Example 5

In the above described embodiments, both the first drive part 210 and the second drive part 220 are formed by the piezoelectric driving devices, however, one of them may be formed by another actuator. As the other actuator, e.g. an electromagnetic motor or a fluid actuator may be used.

D. Third Embodiment

Figure 9:
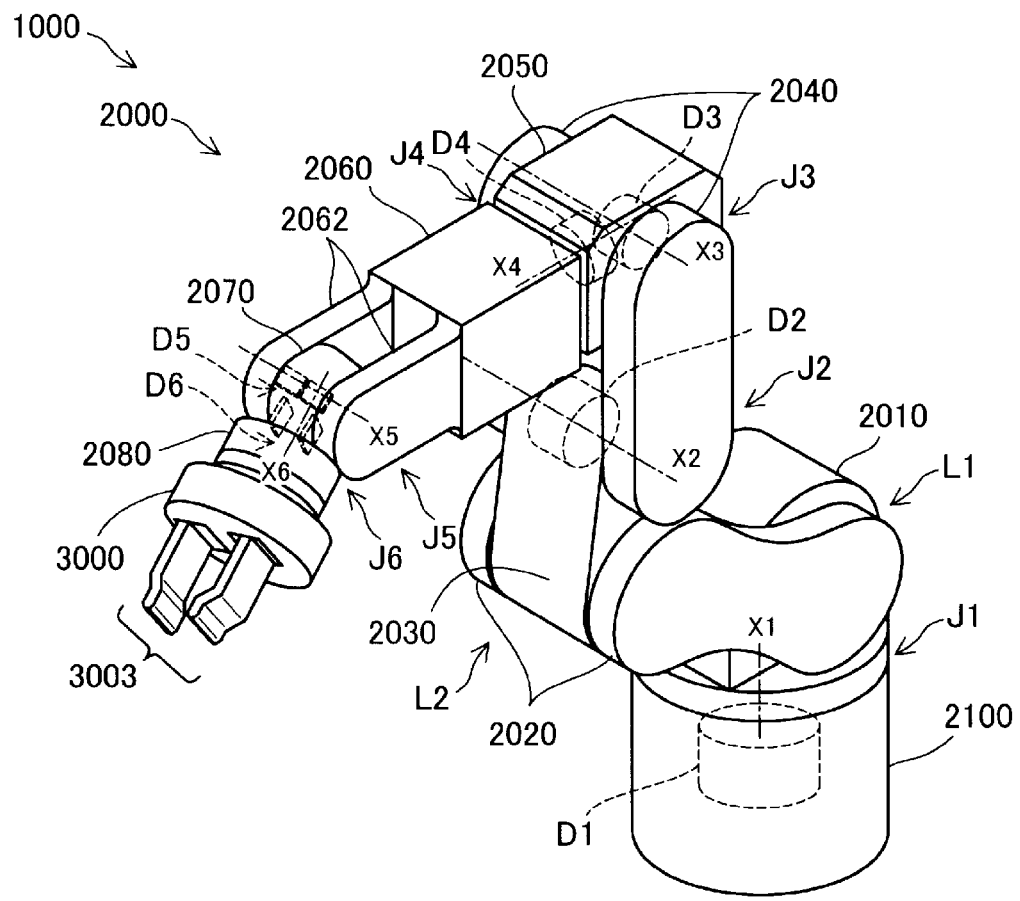
FIG. 9 is an explanatory diagram showing an example of a robot including a robot arm as the third embodiment.

FIG. 9 is an explanatory diagram showing an example of a robot including a robot arm as the third embodiment. A robot 1000 includes a robot arm 2000, and a robot hand 3000 as an end effector attached to the distal end of the robot arm 2000. The robot arm 2000 includes a base 2100 and a plurality of link parts 2010 to 2080, a plurality of joints J1 to J6, and a plurality of fixed coupling parts L1, L2.

The base 2100 and the plurality of link parts 2010 to 2080 are coupled by the plurality of joints J1 to J6 and the plurality of fixed coupling parts L1, L2. The first coupling part L1 and the second coupling part L2 are immovable coupling parts and fixed so that the second link parts 2020 and the third link part 2030 may keep fixed positions with respect to the first link part 2010. On the other hand, the six joints of the first joint J1 to the sixth joint J6 are movable coupling parts, and members coupled via the respective joints J1 to J6 are rotatable relative to each other. Specifically, the first to third link parts 2010 to 2030 are rotatable around a rotation axis X1 with respect to the base 2100 by the first joint J1. One ends of the fourth link parts 2040 are rotatable around a rotation axis X2 with respect to the third link part 2030 by the second joint J2. The fifth link part 2050 is rotatable around a rotation axis X3 with respect to the other ends of the fourth link parts 2040 by the third joint J3. The sixth link part 2060 is rotatable around a rotation axis X4 with respect to the fifth link part 2050 by the fourth joint J4. The seventh link part 2070 is rotatable around a rotation axis X5 by the fifth joint J5 with respect to link parts 2062 on the opposite sides to the parts of the sixth link part 2060 coupled by the fourth joint J4. The eighth link part 2080 is rotatable around a rotation axis X6 with respect to the seventh link part 2070 by the sixth joint J6.

The robot hand 3000 is attached to the distal end surface of the eighth link part 2080. The robot hand 3000 is an end effector that may grasp an object (not shown) with a pair of grasping parts 3003, and is widely used for various operations including grasping of work and grasping a driver or the like to screw work.

Note that the link parts 2062 of the sixth link part 2060, the seventh link part 2070, and the eighth link part 2080 correspond to the wrist part on the distal end of the robot arm 2000, and the fifth joint J5 and the sixth joint J6 correspond to the joints of the wrist part. The eighth link part 2080 corresponds to "distal end part of arm" according to the invention.

Driving devices D1 to D6 for rotation or bending of the respective joints to arbitrary angles are provided in the sixth joints J1 to J6. For the driving devices D1 to D4 of the other four joints J1 to J4 than the two joints J5, J6 of the wrist part, general driving devices including electric motors and reducers (not shown, the reducers can be omitted) are respectively used. On the other hand, for the driving devices D5, D6 of the two joints J5, J6 of the wrist part, driving devices formed by piezoelectric driving devices, which will be described later, are respectively used.

Figure 10:
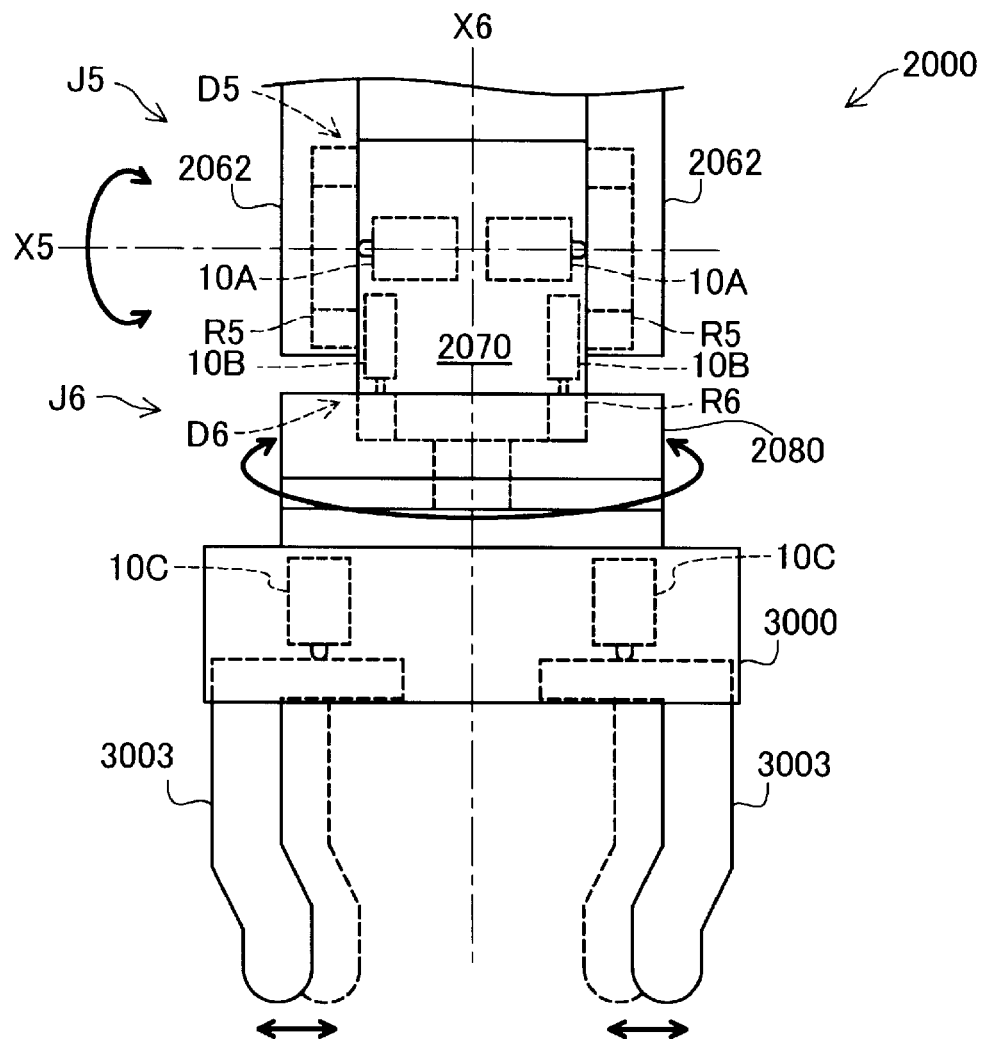
FIG. 10 is an enlarged explanatory diagram showing a wrist part of the robot arm to which a robot hand is attached.

FIG. 10 is an enlarged explanatory diagram showing the wrist part of the robot arm 2000 to which the robot hand 3000 is attached. In the fifth joint J5 as one of the joints of the wrist part of the robot arm 2000, the pair of link parts 2062 of the sixth link part 2060 sandwich the seventh link part 2070 and the eighth link part 2080 is attached to be rotatable about the rotation axis X5. The driving device D5 of the fifth joint J5 includes rotors R5 respectively provided in the pair of link parts 2062 and rotating around the rotation axis X5 as a center axis, and a pair of piezoelectric driving devices 10A provided in the eighth link part 2080 and respectively rotating the pair of rotors R5 relative to each other. Note that only the pair of piezoelectric driving devices 10A may be referred to as the driving device D5.

In the sixth joint J6 as the other of the joints of the wrist part of the robot arm 2000, the eighth link part 2080 is attached to be rotatable about the rotation axis X6 with respect to the seventh link part 2070. The driving device D6 of the sixth joint J6 includes a rotors R6 provided in the eighth link part 2080 and rotating around the rotation axis X6 as a center axis, and a pair of piezoelectric driving devices 10B provided in the seventh link part 2070 and rotating the pair of rotor R6. Note that only the pair of piezoelectric driving devices 10B may be referred to as the driving device D6.

Figure 11:
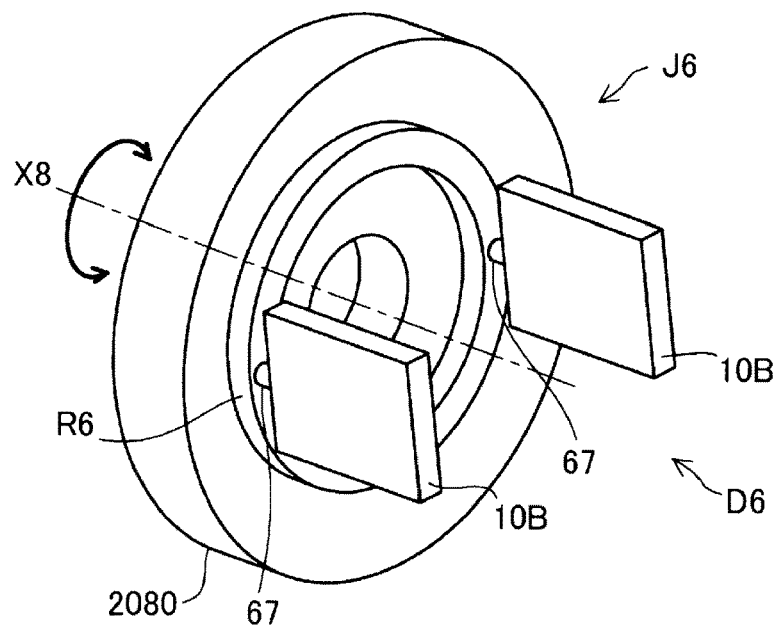
FIG. 11 is a schematic enlarged perspective view showing a part of a sixth joint in FIG. 10.

FIG. 11 is a schematic enlarged perspective view showing a part of the sixth joint J6 in FIG. 10. The rotor R6 provided in the eighth link part 2080 has an annular shape and the pair of piezoelectric driving devices 10B are mounted on the seventh link part 2070 so that projecting portions of the piezoelectric driving devices 10B, which will be described later, may be in contact in point-symmetric positions on the annular surface of the rotor R6 perpendicular to the rotation axis X6 (see FIG. 10). The sixth joint J6 rotates the eighth link part 2080 and the robot hand 3000 about the rotation axis X6 by the pair of piezoelectric driving devices 10B rotating the rotor R6. The rotation motion of the rotor by the piezoelectric driving devices will be described later.

Though not illustrated, the pair of rotors R5 (see FIG. 2) provided in the pair of link parts 2062 of the sixth link part 2060 also have annular shapes like the rotor R6 shown in FIG. 11, and the pair of piezoelectric driving devices 10A are mounted on the seventh link part 2070 so that projecting portions of the piezoelectric driving devices 10A, which will be described later, may be in contact on the annular surfaces of the corresponding rotors R5. The fifth joint J5 also rotates the eighth link part 2080 and the robot hand 3000 about the rotation axis X5 by the pair of piezoelectric driving devices 10A rotating the respective rotors R5.

As shown in FIG. 10, the pair of grasping parts 3003 are stood in the robot hand 3000. The base end portions of the grasping parts 3003 are movable within the robot hand 3000 and piezoelectric driving devices 10C are mounted so that projecting portions thereof may be in contact with the base portions of the grasping parts 3003. Accordingly, the piezoelectric driving devices 10C are operated, and thereby, the grasping parts 3003 may be moved to grasp an object.

Note that, as described above, the rotors R5, R6 have the annular shapes, so that various cables etc. (electric wires, tubes, etc.) may pass through the opening portions at the centers.

Figure 12:
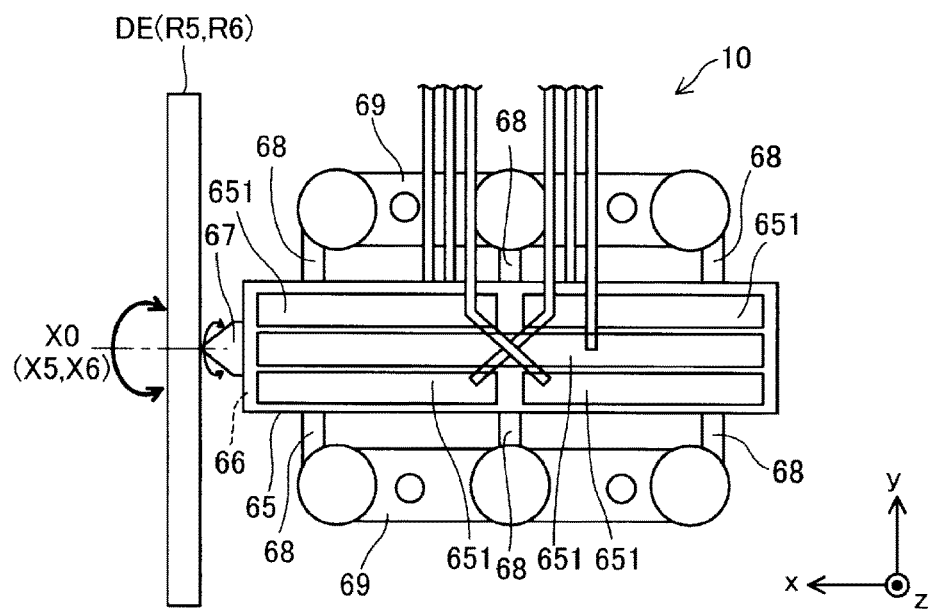
FIG. 12 is an explanatory diagram showing an example of a piezoelectric driving device.

FIG. 12 is an explanatory diagram showing an example of a piezoelectric driving device. As below, for convenience of explanation, the paper near side in FIG. 12 is referred to as "front side" and the opposite side is referred to as "rear side". A piezoelectric driving device 10 shows an example of the piezoelectric driving device corresponding to the piezoelectric driving devices 10A to 10C shown in FIG. 10. The piezoelectric driving device 10 is driven by a drive circuit (not shown) and rotates a rotor DE as a driven member around a center axis X0. The drive circuits of the piezoelectric driving devices 10A, 10B, 10C are respectively mounted on the control unit provided within the base 2100 in FIG. 9.

The piezoelectric driving device 10 is a stacked body including two sets of vibrating structures 65 including five piezoelectric elements 651 and a vibrating plate 66 inserted and bonded between the sets.

Each of the five piezoelectric elements 651 of the vibrating structure 65 includes a piezoelectric body, and a first electrode and a second electrode sandwiching the piezoelectric body (not shown). One of the first electrode and the second electrode may be a common electrode. These piezoelectric elements 651 are electrically connected to the drive circuit (not shown). Note that it is only necessary that the vibrating structure 65 includes at least one piezoelectric element 651, and other various numbers and arrangements of the elements may be employed. Further, it is only necessary that the vibrating structure 65 is provided at least on one of the two surfaces (a first surface and a second surface) of the vibrating plate 66.

On an end of the piezoelectric driving device 10, a protruding portion 67 is provided. On both side surfaces of the piezoelectric driving device 10, a plurality of supporting portions 68 for supporting the piezoelectric driving device 10 are provided in positions corresponding to the nodes of the vibration. These supporting portions 68 are integrally formed with the vibrating plate 66. It is preferable that the plurality of supporting portions 68 protruding from the same side of the vibrating plate 66 are coupled via a connecting plate 69.

Figures 13A, 13B:
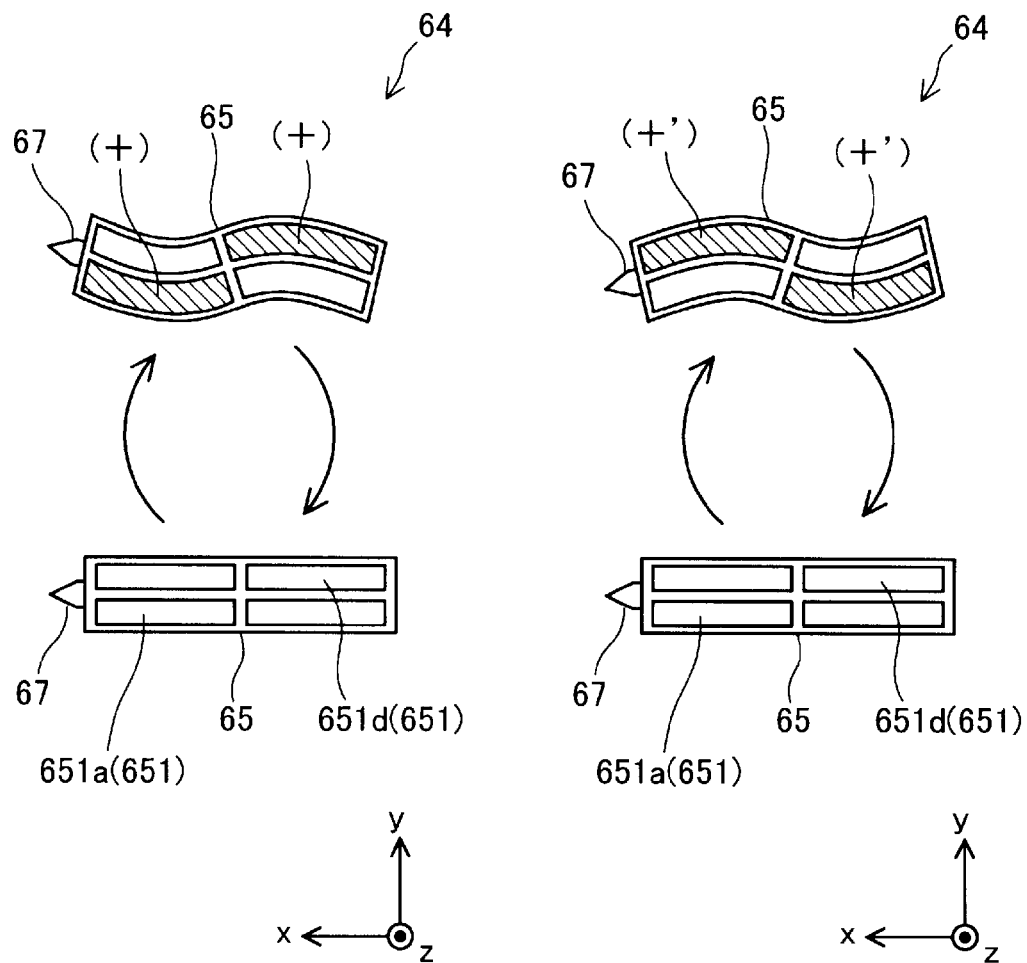
FIGS. 13A and 13B are explanatory diagrams showing an operating principle of the piezoelectric driving device.

FIGS. 13A and 13B are explanatory diagrams showing an operating principle of the piezoelectric driving device 10. To facilitate explanation, in FIGS. 13A and 13B, of the five piezoelectric elements 651 in FIG. 12, only four diagonally provided piezoelectric elements 651 are shown, and one piezoelectric element 651 at the center is omitted. When a voltage is applied to the piezoelectric elements 651 at a constant frequency, the piezoelectric driving device 10 moves by expansion and contraction or elliptic motion of the projecting portion 67 of the piezoelectric driving device 10. Namely, as shown in FIG. 13A, with the two piezoelectric elements 651 diagonally located to each other as one pair, when a voltage at a specific frequency is applied thereto, the piezoelectric driving device 10 is bent and deformed into a meandering shape (S-shape) and the end of the projecting portion 67 makes a reciprocating motion or elliptic motion in a specific direction. As a result, the rotor DE (FIG. 12) in contact with the projecting portion 67 rotates in a predetermined direction. Further, as shown in FIG. 13B, when a voltage at a specific frequency is applied to the other pair of piezoelectric elements 651, the rotor DE rotates in the opposite direction. The movement of the piezoelectric driving device 10 (or the vibrating structure 65) is described in the related art document (JP-A-2004-320979 or the counterpart U.S. Pat. No. 7,224,102), and the disclosure is incorporated herein by reference.

In FIGS. 12, 13A, and 13B, the case where the rotor DE is rotated by the piezoelectric driving device 10, namely, the case where the driven member is rotationally moved by the piezoelectric driving device 10 is explained as an example, however, the driven member can be linearly moved like the grasping parts 3003 of the robot hand 3000.

The piezoelectric driving device 10 is used as the piezoelectric driving device 10A, and thereby, as described above, in the fifth joint J5, the pair of piezoelectric driving devices 10A may relatively rotate the respective rotors R5 and rotate the eighth link part 2080 and the robot hand 3000 about the rotation axis X5. Similarly, the piezoelectric driving device 10 is used as the piezoelectric driving device 10B, and thereby, as described above, in the sixth joint J6, the pair of piezoelectric driving devices 10B may rotate the respective rotor R6 and rotate the eighth link part 2080 and the robot hand 3000 about the rotation axis X6. Further, the piezoelectric driving device 10 is used as the piezoelectric driving device 10C, and thereby, in the robot hand 3000, the grasping parts 3003 are moved to grasp an object.

The control unit (not shown) controls the operations of the driving devices D1 to D6 based on a program previously stored. The configuration of the control unit is not particularly limited. For example, the control unit may be implemented as a dedicated circuit or a circuit configuration including a micro processor and a memory may be employed.

Here, as described in BACKGROUND, there are problems that, if priority is given to the mounting space for the driving device within the robot arm, the size of the robot arm including thickness is larger, and, in contrast, if priority is given to the size of the robot arm including thickness, the space for the driving device and wiring etc. therefor is harder to be secured. Further, when the driving device by the electromagnetic motor is used, the deadweight of the robot arm is larger. The driving device closer to the base side of the robot arm requires a driving device using a larger-sized higher-power electromagnetic motor, and it is preferable to reduce the weight of the robot arm, particularly, the weight of the distal end (wrist) side. Furthermore, in order to suppress sagging of the robot arm due to its own weight, it is preferable to reduce the weight of the robot arm, particularly, the weight of the distal end (wrist) side. However, when the driving devices of the respective joints of the arm are formed by driving devices by electric motors, to secure the arrangement space for the driving devices and the space for wiring etc., the distal end side of the arm becomes thicker depending on the apparatus size required therefor, and it is difficult to reduce the dead weight over the distal end side of the arm.

On the other hand, in the robot arm 2000 of the robot 1000 of the embodiment, as described above, the driving devices D5, D6 of the joints J5, J6 corresponding to the joints of the wrist are formed by the piezoelectric driving devices 10A, 10B. The piezoelectric driving devices 10A, 10B have the structures of the piezoelectric driving device 10 shown in FIG. 12, and have structures that can be reduced in size, thickness, and weight compared to electric motors used generally for a drive source. Accordingly, the driving devices D5, D6 can be reduced in size and weight. Thereby, in the joints J5, J6 corresponding to the joints of the wrist, the wrist part can be reduced in size and weight and sagging due to its own weight can be suppressed while the arrangement space, the wiring space, etc. of the driving devices D5, D6 are secured.

The rotors R5, R6 driven by the piezoelectric driving devices 10A, 10B have the annular shapes as shown in FIG. 11, so that various cables etc. (electric wires, air tubes, etc.) may pass through the opening portions at the centers, and the shortage of the arrangement space for the cables etc. may be improved.

In FIGS. 9 and 10 of the above described embodiment, as the end effector attached to the distal end of the robot arm 2000, the robot hand 3000 including the pair of grasping parts 3003 is shown as an example, however, not limited to that. Various end effectors can be applied.

Figure 14:
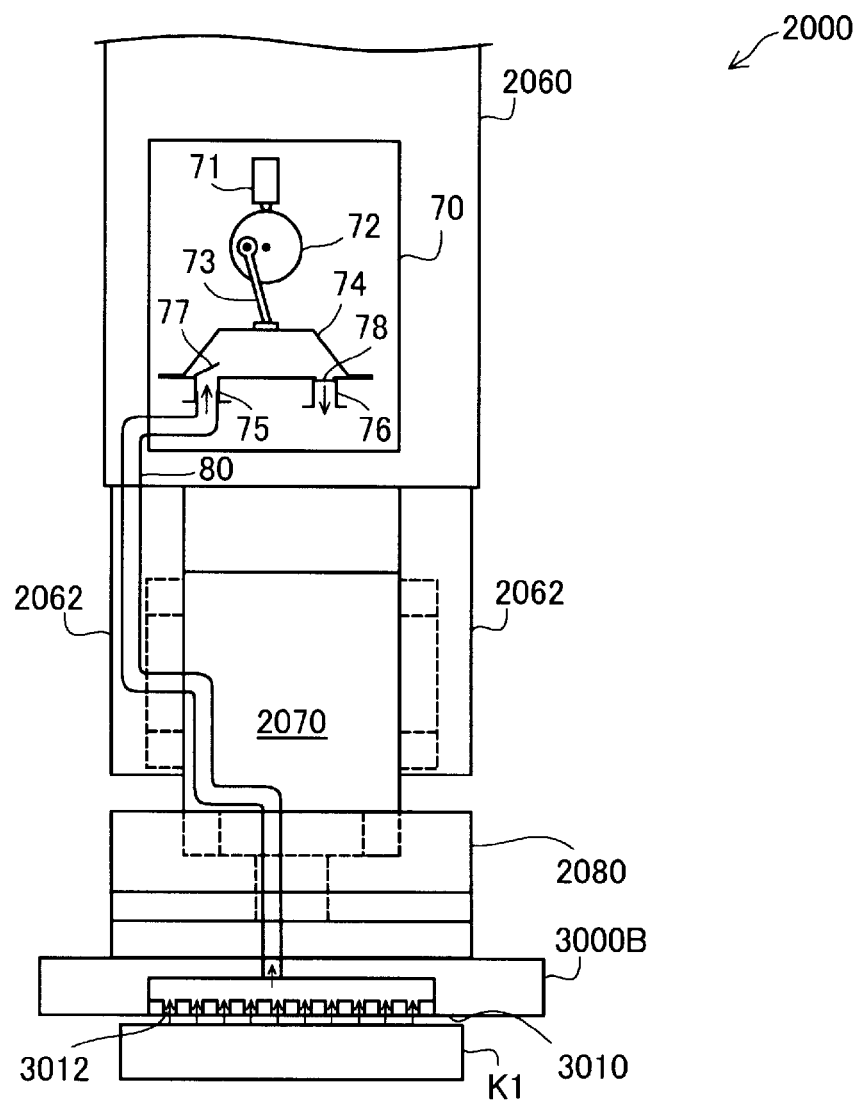
FIG. 14 is an enlarged explanatory diagram showing a wrist part of a robot arm to which another example of a robot hand is attached.

FIG. 14 is an enlarged explanatory diagram showing the wrist part of the robot arm 2000 to which another example of a robot hand is attached. In this example, a robot hand 3000B is attached to the distal end of the eighth link part 2080 of the robot arm 2000. The robot hand 3000B is a suction hand that suctions an object to be suctioned K1 using negative pressure by air taken from a plurality of intake ports 3012 provided in a distal end surface 3010.

The plurality of intake ports 3012 are connected to an intake port 75 of a suction pump 70 mounted in an internal space of the sixth link part 2060 via an air tube 80 provided in internal spaces of the eighth link part 2080, the seventh link part 2070, and the link parts 2062 of the sixth link part 2060. As the suction pump 70, a diaphragm vacuum pump is shown as an example. The suction pump 70 converts a rotation motion of a rotor 72 generated by a piezoelectric driving device 71 (corresponding to the piezoelectric driving device 10 in FIG. 12) into a reciprocating motion of a diaphragm 74 by a connecting rod 73 connecting between the diaphragm 74 and the rotor 72. Thereby, an intake valve 77 of the intake port 75 and an exhaust valve 78 of an exhaust port 76 are opened and closed to generate negative pressure by the air taken from the intake ports 3012, and thereby, the object to be suctioned K1 is suctioned by the distal end surface 3010.

The suction pump 70 is not limited to the diaphragm vacuum pump, but various pumps can be used. Further, in the example of FIG. 14, the configuration in which the suction pump 70 and the air tube 80 are mounted within the robot arm 2000 is explained, however, the suction pump 70 may be mounted on the outside of the sixth link part 2060 and the suction pump 70 and the robot hand 3000B are connected by the air tube 80 outside of the robot arm 2000.

As the robot hand 3000 shown in FIGS. 9 and 10, the case where the grasping parts 3003 are driven by the piezoelectric driving devices 10C is explained as an example, however, a robot hand having a structure of driving the grasping parts 3003 using an air cylinder, a hydraulic cylinder, or the like can be employed.

When another end effector than the above described robot hands 3000, 3000B is attached, corresponding driving devices are mounted according to the end effector.

E. MODIFIED EXAMPLES

The invention is not limited to the above described examples and embodiments, but can be embodied in various aspects without departing from the scope of the invention. For example, the following modifications may be made.

Modified Example 1

In the above described embodiments, the number of movable joints of the plurality of joints J1 to J6 of the robot arm 2000 of the robot 1000 is six, however, not limited to that. The number may be any number equal to or more than three in the invention.

Modified Example 2

In the above described embodiments, the driving devices D5, D6 of the two joints J5, J6 corresponding to the wrist part of the robot arm 2000 are the driving devices by the piezoelectric driving devices 10A, 10B, however, not limited to those. The sixth joint J6 may be an immovable coupling part (fixed coupling part) and only the driving device of the fifth joint J5 may be a driving device by the piezoelectric driving device. Or, the driving device of the another joint may be a driving device by the piezoelectric driving device. Of the plurality of joints of the robot arm, the driving device of at least one joint may be a driving device formed by the piezoelectric driving device and the driving device of at least one joint may be a driving device formed by the electric motor.

Modified Example 3

The case where the robot 1000 of the above described embodiments includes the single robot arm 2000 is explained as an example, however, not limited to that. A robot including a plurality of robot arms may be employed. When the plurality of robot arms are provided, in each robot arm, of a plurality of joints, the driving device of at least one joint may be a driving device formed by the piezoelectric driving device and the driving device of at least one joint may be a driving device formed by the electric motor.

The invention is not limited to the above described embodiments, examples, and modified examples and may be implemented in various configurations without departing from the scope of the invention. For example, the technical features in the embodiments, the examples, and the modified examples corresponding to the technical features in the respective configurations described in SUMMARY may be appropriately replaced and combined for achieving part or all of the above described advantages. Further, the technical features may be appropriately deleted without explanation as essentials in the specification.

The entire disclosure of Japanese Patent Application No. 2014-215138, filed Oct. 22, 2014 and 2014-214949, filed Oct. 22, 2014 are expressly incorporated by reference herein.

What is claimed is:

1. A robot including a first arm unit and a second arm unit, comprising:
   a first drive part provided within the first arm unit and rotating the first arm unit about a first axis; and
   a second drive part provided within the first arm unit and rotating the second arm unit about a second axis,
   wherein at least one of the first drive part and the second drive part contains a piezoelectric body.

2. The robot according to claim 1, wherein, when the first drive part and the second drive part are seen along a third axis orthogonal to the first axis and the second axis, there is a part in which the first drive part and the second drive part overlap.

3. The robot according to claim 1, wherein, when the first drive part and the second drive part are seen along the second axis, there is a part in which the first drive part and the second drive part overlap, and, when the second drive part is seen along the first axis, there is a part in which a driven part driven by the first drive part and the second drive part overlap.

4. The robot according to claim 3, wherein the driven part has an opening.

5. The robot according to claim 1, wherein the first axis and the second axis are orthogonal to each other.

6. The robot according to claim 1, wherein the first drive part and the second drive part respectively contain piezoelectric bodies.

7. The robot according to claim 6, wherein the first drive part is formed by one or more first piezoelectric driving devices containing the piezoelectric bodies.

8. The robot according to claim 7, wherein the second drive part is formed by one or more second piezoelectric driving devices containing the piezoelectric bodies.

9. The robot according to claim 8, wherein a number of the second piezoelectric driving devices forming the second drive part is smaller than a number of the first piezoelectric driving devices forming the first drive part.

10. The robot according to claim 1, further comprising an end effector provided in the second arm unit.

* * * * *